United States Patent
Lee et al.

(10) Patent No.: US 10,761,583 B2
(45) Date of Patent: Sep. 1, 2020

(54) VARIATION-AWARE INTRA-NODE POWER SHIFTING AMONG DIFFERENT HARDWARE COMPONENTS

(71) Applicant: International Business Machines Corporation, Armonk, NY (US)

(72) Inventors: Eun Kyung Lee, Bedford Corners, NY (US); Bilge Acun, White Plains, NY (US); Yoonho Park, Chappaqua, NY (US); Alessandro Morari, New York, NY (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/127,958

(22) Filed: Sep. 11, 2018

(65) Prior Publication Data

US 2020/0081513 A1 Mar. 12, 2020

(51) Int. Cl.
*G06F 1/32* (2019.01)
*G06F 1/3206* (2019.01)
*G06F 11/34* (2006.01)
*G06F 9/50* (2006.01)
*G05F 1/66* (2006.01)

(52) U.S. Cl.
CPC .............. *G06F 1/3206* (2013.01); *G05F 1/66* (2013.01); *G06F 9/5094* (2013.01); *G06F 11/3452* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 7,617,406 B2 | 11/2009 | Yasuo | |
| 8,375,229 B2 | 2/2013 | Saeki | |
| 9,261,935 B2 | 2/2016 | Branover et al. | |
| 9,791,902 B2 | 10/2017 | Ragupathi et al. | |
| 9,874,922 B2 | 1/2018 | Varma et al. | |
| 2017/0023997 A1 | 1/2017 | Chen et al. | |
| 2019/0033944 A1 | 1/2019 | Lee et al. | |
| 2019/0163540 A1 | 5/2019 | Lee et al. | |

FOREIGN PATENT DOCUMENTS

WO 2009059025 A2 5/2009

OTHER PUBLICATIONS

Rosedahl, T., "Power/Performance Controlling Techniques in OpenPOWER", ISC High Performance Workshops 2017, First online Oct. 20, 2017, pp. 275-289, LNCS vol. 10524.

(Continued)

*Primary Examiner* — Zahid Choudhury
(74) *Attorney, Agent, or Firm* — Scully, Scott, Murphy & Presser, P.C.; Daniel P. Morris

(57) ABSTRACT

An application to run on a computer node comprising a plurality of hardware components is received. Expected performance of the hardware components is received. A power shifting ratio associated with each of the plurality of hardware components for each phase of the application is determined. Power between the hardware components is dynamically shifted based on the power shifting ratio at different phases of the application.

20 Claims, 12 Drawing Sheets

(56) References Cited

OTHER PUBLICATIONS

Inadomi, Y., et al., "Analyzing and Mitigating the Impact of Manufacturing Variability in Power-Constrained Supercomputing," SC' 2015, Nov. 15-20, 2015, 12 pages.

Gholkar, N., et al., "Power Tuning HPC Jobs on Power-Constrained Systems," PACT '16, Sep. 11-15, 2016, 13 pages.

Felter, W., et al., "A performance-Conserving Approach for Reducing Peak Power Consumption in Server Systems", Conference Paper, Jan. 2005, ICS '05, Jun. 20-22, pp. 293-302.

Paul, I., et al., "Coordinated Energy Management in Heterogeneous Processors", SC '13, Nov. 17-21, 2013, 12 pages.

Wikipedia, "Performance per watt", https://en.wikipedia.org/wiki/Performance_per_watt, Last edited Aug. 26, 2018, Accessed on Sep. 11, 2018, 7 pages.

Zhan, X., "Energy-Efficiency Optimization Techniques for Computing Clusters: Exploiting the Heterogeneities", Dissertation, School of Engineering at Brown University, Providence, Rhode Island, May 2018, 146 pages.

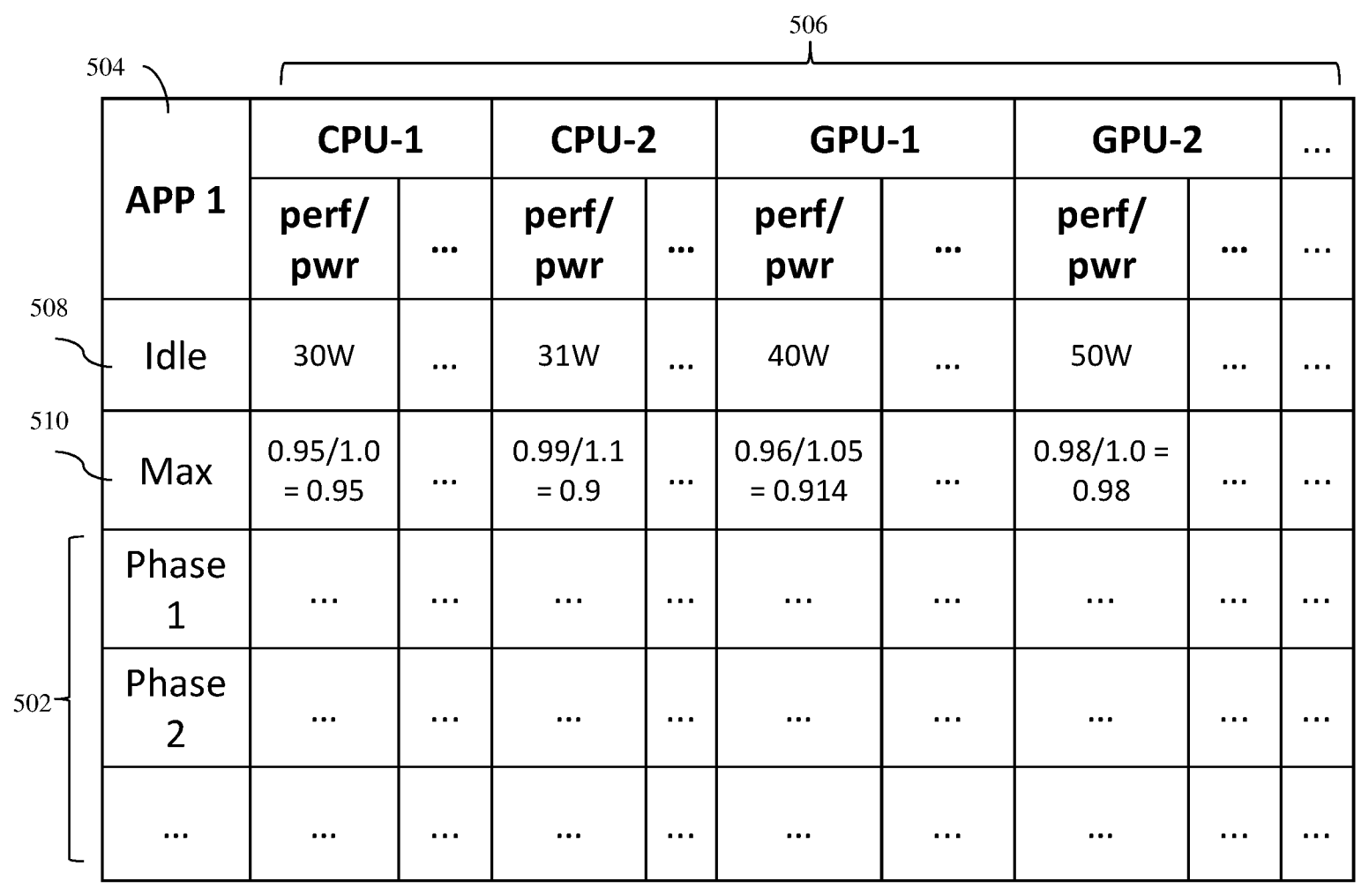

| APP 1 | CPU-1 | | CPU-2 | | GPU-1 | | GPU-2 | | |
|---|---|---|---|---|---|---|---|---|---|
| | perf/pwr | ... | perf/pwr | ... | perf/pwr | ... | perf/pwr | ... | ... |
| Idle | 30W | ... | 31W | ... | 40W | ... | 50W | ... | ... |
| Max | 0.95/1.0 = 0.95 | ... | 0.99/1.1 = 0.9 | ... | 0.96/1.05 = 0.914 | ... | 0.98/1.0 = 0.98 | ... | ... |
| Phase 1 | | ... | | ... | | ... | | ... | ... |
| Phase 2 | | ... | | ... | | ... | | ... | ... |
| ... | | ... | | ... | | ... | | ... | ... |

FIG. 5

VARIATION-AWARE INTRA-NODE POWER SHIFTING AMONG DIFFERENT HARDWARE COMPONENTS

BACKGROUND

The present application relates generally to computers and hardware processors, and more particularly to power shifting among hardware components.

Intrinsic manufacturing differences can cause power variations between identical hardware components such as the central processing unit, graphics processing unit, memory and other units on a processor. Generally, hardware component performance varies with power resulting in efficient and inefficient components. If a hardware component's power varies, its performance may vary as much as the power varies. For instance, with large processor counts, distribution of power histogram is expected to form a Gaussian distribution, identifying processors which are power efficient or inefficient. Distribution of power histogram can be different for each hardware component and for the total power of a node. Voltage adjustment to tune the performance may affect the chip power.

BRIEF SUMMARY

An apparatus, in one aspect, may include a node comprising hardware components. A power management controller may be coupled to a circuit of the node. A memory coupled to the node may store an expected performance table comprising measured power variation of the hardware components in different phases of the application. The power management controller may be operable to receive an application to run on a computer node comprising a plurality of hardware components, receive expected performance of the hardware components, determine a power shifting ratio associated with each of the plurality of hardware components for each of the different phases of the application based on the expected performance, and dynamically shift power between the hardware components based on the power shifting ratio at the different phases of the application running on the hardware components.

A method, in one aspect, may include receiving an application to run on a computer node comprising a plurality of hardware components. The method may also include receiving expected performance of the hardware components, the expected performance comprising measured power variation of the hardware components in different phases of the application. The method may further include determining a power shifting ratio associated with each of the plurality of hardware components for each of the different phases of the application based on the expected performance. The method may further include dynamically shifting power between the hardware components based on the power shifting ratio at the different phases of the application running on the hardware components.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 is a diagram illustrating an expected performance table (EPT) and populating of the EPT in one embodiment.

DETAILED DESCRIPTION

Figure 1:
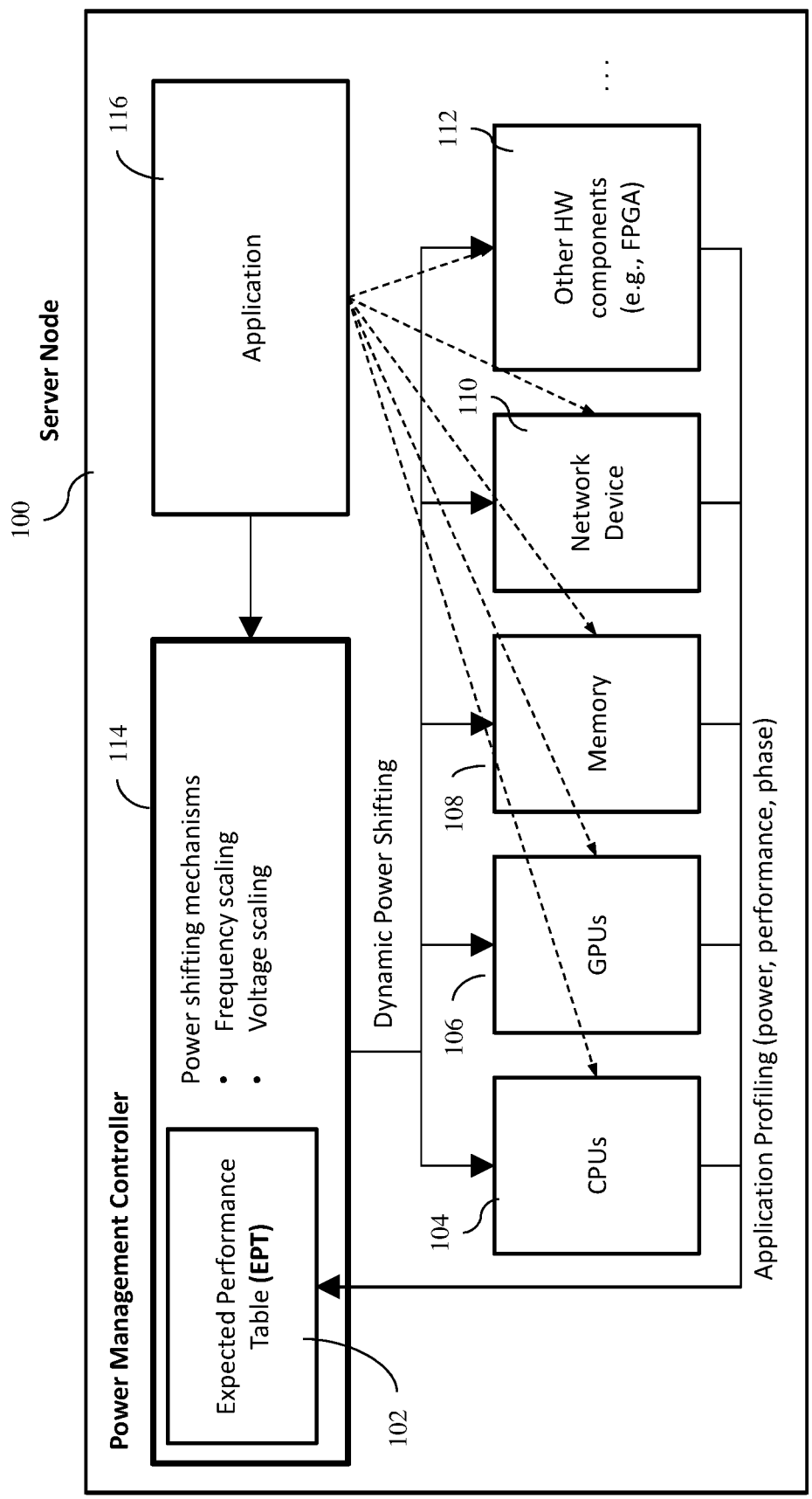
FIG. 1 is a diagram illustrating components of an apparatus in one embodiment.

Intra-node hardware component utilization and corresponding power draw changes over time depending on application phases. Aspects of the present disclosure include an apparatus, system, firmware, method and techniques, which facilitate dynamically shifting power between intra-node hardware components. Examples of hardware components may include but are not limited to, a central processing unit (CPU), a graphics processing unit (GPU), a memory device, a network device, and other accelerators. In some embodiments, an expected performance table (EPT) for each hardware component in consideration, for example on a node, may be generated, which profiles power and/or performance variation associated with different application phases. Based on data stored in the EPT, efficient and inefficient, and slightly-utilized and highly-utilized hardware components may be identified. Power is shifted from an efficient to inefficient component and slightly-utilized components to highly-utilized components dynamically for different application phases to meet power cap requirement. In some embodiments, an algorithm is provided, which decides power shifting ratio based on the EPT.

In some aspects, the intra-node power shifting between efficient and inefficient hardware components in different application phases increases application performance on the node. In some embodiments, the expected performance of each hardware component is profiled and saved or stored in the EPT with different application phases. Additionally, the idle power (minimal power consumption) and Thermal Design Power (TDP) or maximum power capacity are noted during the manufacturing phase and used for the power and performance normalization. Briefly, Thermal Design Power (TDP) refers to the maximum amount of heat generated by a computer chip or component such as the CPU, GPU or another component. Generally, expected performance is higher for efficient components and lower for inefficient components. The powers required to maximize performance of different components are computed for a node. Then, the power shifting ratio is calculated depending on the inherent efficiency of the hardware component. Generally, efficient components need less power than inefficient components; Highly-utilized components need more power than slightly-utilized components. In some embodiments, power is shifted from an efficient component to an inefficient component and/or a slightly-utilized component to a highly-utilized component dynamically to meet power cap requirements. Briefly, power cap or power capping refers to keeping power consumption of a power to a predetermined amount. Power capping can maintain safe temperature of a component.

In some embodiments, power shifts from one or more efficient components to inefficient components and/or one or more slightly-utilized components to highly-utilized components. The efficiency and the expected usage of data are stored in and utilized from an expected performance table (EPT), for example, generated according to an embodiment. A node (e.g., of a computer or a server) contains one or more sockets and a socket holds one processor (e.g., a CPU, a GPU, a FPGA), also referred to as a chip (a physical integrated circuit (IC)). A node may contain other hardware components and/or devices such as a memory and a network device. The socket refers to a physical connector on a computer motherboard that accepts a single physical chip. A processor can contain one or more cores, e.g., CPU cores. A processor or chip that contains multiple cores is referred to as a multi-core processor or chip, for instance, employing multi-core technology. As an example, a core can comprise a logical execution unit containing an L1 cache and functional units. Cores can independently execute programs or threads.

FIG. 1 is a diagram illustrating components of server node in one embodiment according to the present disclosure. In some embodiments, power shifts from one or more efficient components to one or more inefficient components and/or one or more slightly-utilized components to one or more highly-utilized components. An expected performance table (EPT) 102, for example, generated according to an embodiment stores the efficiency and the expected usage of data. A node 100 (e.g., of a computer or a server), in some embodiments, may include one or more processors, e.g., one or more CPUs 104, one or more GPUs 106, one or more FPGAs 112, or another. The node 100 may also include other hardware components such as a memory 108 and a network device 110. A power management controller 114 may receive an application 116 to be run on the node 110, determine different phases involved in the application 116, and based on the entries in the EPT 102, shift power among the hardware components, e.g., 104, 106, 108, 110, 112, in running the application 116.

Figure 2:
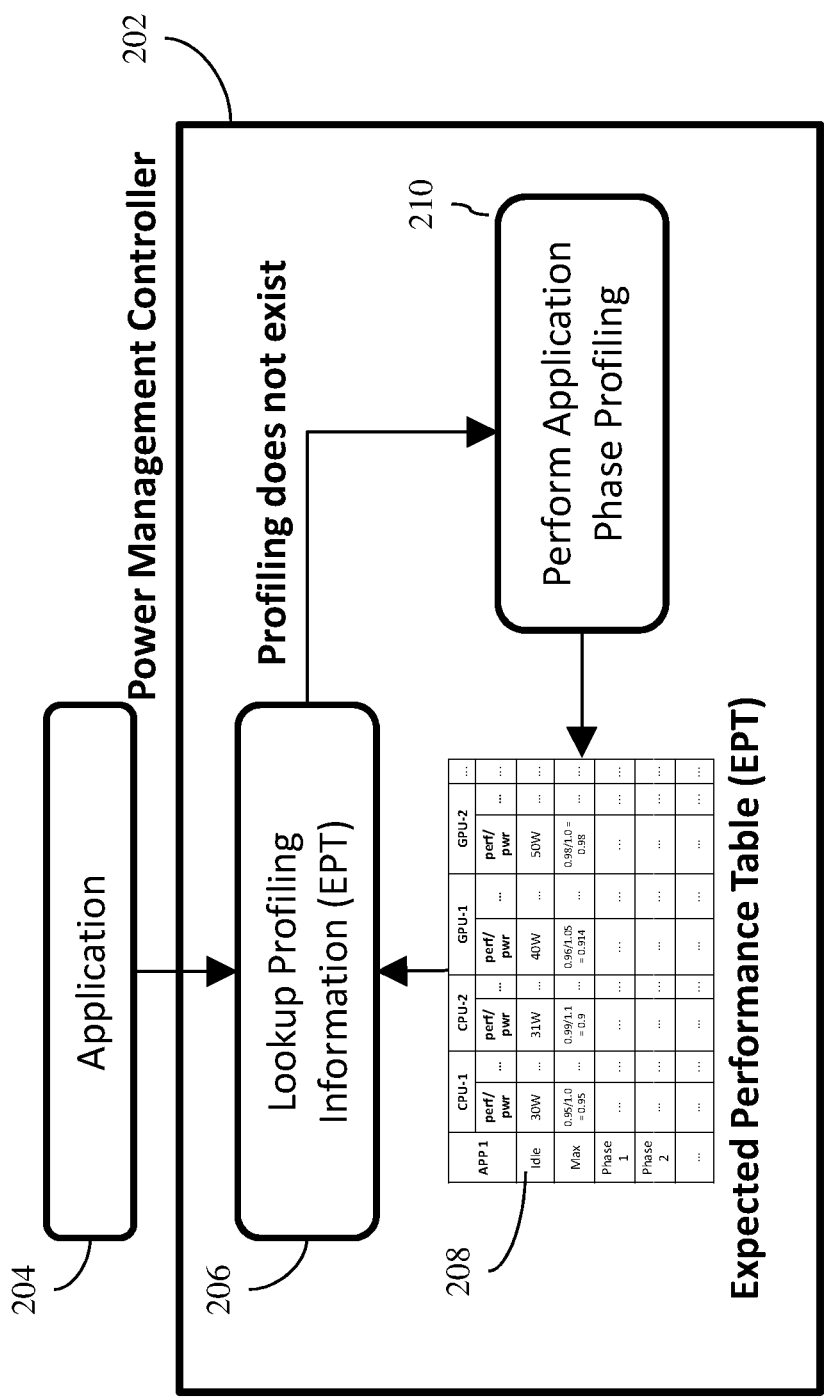
FIG. 2 is a diagram illustrating a power management controller in one embodiment according to the present disclosure.

FIG. 2 is a diagram illustrating a logic flow of a power management controller in one embodiment according to the present disclosure. A power management controller 202 in some embodiments is coupled to a circuitry of a node, e.g., hardware components such as the processors, memory and network devices, and may be implemented as a programmed hardware or a firmware. The power management controller 202 receives an application 204 to run on the node, and responsive to receiving the application to run 204 performs a lookup of the profiling information associated with the hardware components on the node (e.g., shown at 206) stored in the EPT 208, with respect to different phases of the application 204. Responsive to determining that the information associated with the received application's phases does not exist in the EPT 208, the power management controller 202 may perform application phase profiling dynamically (e.g., shown at 210).

Figure 3:
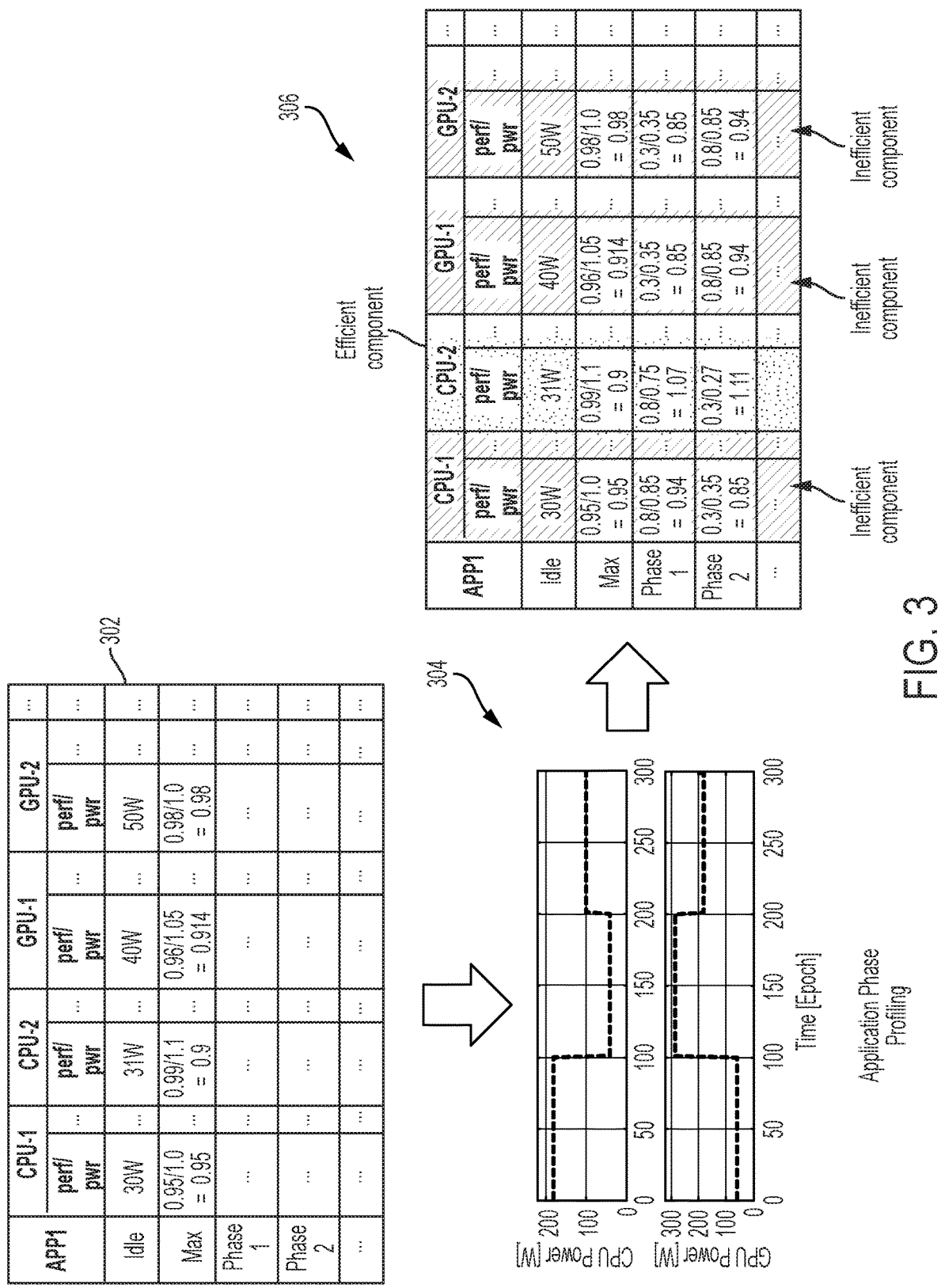
FIG. 3 is a diagram illustrating an example expected performance table (EPT) and application phase profiling generating the EPT in one embodiment according to the present disclosure.

FIG. 3 is a diagram illustrating an example expected performance table (EPT) and application phase profiling generating the EPT in one embodiment according to the present disclosure. An EPT 302 may record for each hardware component per application, power consumption associated with each phase of the application. Application phase profiling 304 determines different phases of an application, and the power usage by the hardware components (e.g., CPU, GPU) in running the different phases of the application. The EPT at 306 shows the populated EPT, which can indicate or identify efficient and inefficient components.

The EPT 306 may also record or store data from which highly utilized or under (or slightly) utilized components can be identified. For instance, based on the amount of power a component draws (uses) compared with the maximum power capacity of the component, the percentage or ratio of the utilization can be computed or determined. Comparing the utilization rate to a threshold value can identify whether a component is highly utilized or slightly utilized. As another example, a percentage of CPU or GPU utilization reported by an operating system (OS) can be used to determine the utilization levels too. For instance, OS commands such as "/proc/stat" in CPUs, "nvidia-smi" command in GPUs can provide such utilization data.

Figure 4:
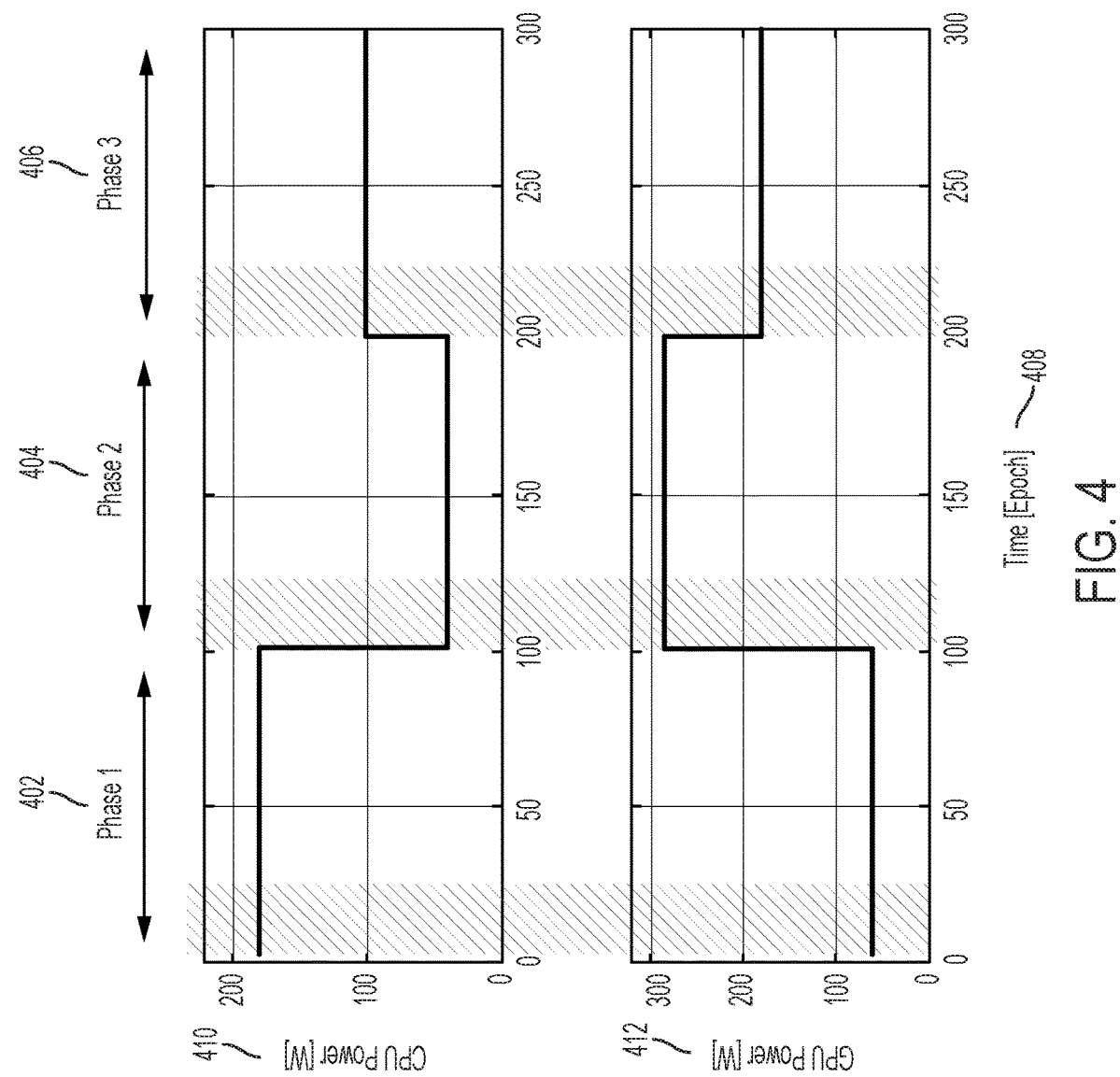
FIG. 4 is a diagram illustrating an example application phase profiling in one embodiment.

FIG. 4 is a diagram illustrating an example application phase profiling in one embodiment. The application phase profiling, in some aspects, profiles (e.g., monitors and assesses) power and performance of one or more hardware components 410, 412 during the running of an application phase of an application, for instance, for each phase 402, 404, 406. In some embodiments, application phases can be defined by time periods or epochs 408. In some embodiments, "#pragma" directive can be used to detect an application phase. In some embodiments, application profiling can be performed at the beginning of each application phase to adjust power shifting ratio. In some aspect, the application profiling period can vary depending on the application. In some embodiments, application profiling can be performed separately to fill the EPT. Profiled information is archived in the Expected Performance Table (EPT) or the like.

A power monitor, which can include hardware and/or firmware may be coupled to a circuit of a component, can obtain the current and voltage information to determine a component's power consumption. In some aspects, power can be measured using in-band (within operating system) or out-of-band (without the operating system). Annotation technique can be used to mark and separate different application phases for profiling, and profiling tools (e.g., "perf") can be used to measure performance by reading hardware counters (e.g., CPU usage, memory usage).

FIG. 5 is a diagram illustrating an expected performance table (EPT) and populating of the EPT in one embodiment. In some embodiments, the EPT stores performance and power (perf/pwr, also referred to as "performance per watt") measures of a hardware component, for example, executing or running an application, for instance, by application phases. The EPT may exist for multiple applications for multiple hardware components. In some embodiments, performance and power measures (perf/pwr) are normalized based on the mean of maximum performance and power (perf/pwr) measured over multiple of the same type of component, for example, for each type of component (e.g., multiple CPUs, multiple GPUs, and/or others) performing on the same and/or different nodes. In some aspects, performance may be measured in normalized execution time and power may be measure in watts. In some aspects, a normalized value of perf/pwr which is greater than or equal to 1.0 indicates that a hardware component is efficient, while a normalized value of perf/pwr which is less than 1.0 may indicate that a hardware component is inefficient.

In some embodiments, hardware component performance and power data is archived in different application phases 502 of an application 504 for different hardware components 506. The data also may include idle 508 and thermal design power (TDP or max) 510 rows (entries) corresponding to the hardware components 506. The idle 508 entry records or stores data associated with the power the component uses or draws when in idle mode, for example, not executing an application. The max 510 entry records or stores data associated with mean performance data associated with the application and the mean power the component draws in executing the application. The idle power refers to power draw of a component when the component is idle, which can represent a minimal power consumption. Thermal Design Power (TDP) or maximum power refers to the maximum amount of power draw by a semiconductor. In some embodiments, the idle 508 and max 510 data may be obtained or determined from the manufacturing test performed of the corresponding hardware components, for instance, data from the manufacturing test stage. In some embodiments, idle 508 rows or entries store the power measurement without the performance measurement (e.g., since the component is idle and not executing an application). In this way, the EPT automatically captures power variation.

In some embodiments, additional information such as the execution time of a specific application phase and chip frequency (e.g., clock rate of a central processing unit (CPU) or/and a graphics processing unit (GPU),) can be added to the table to further optimize performance and power in time considering timing and overhead caused by power shifting. For example, if the overhead incurred in power shifting (delay in changing power) is higher than the execution time of a specific application phase, the methodology of the present disclosure may decide not to shift the power.

Figure 6:
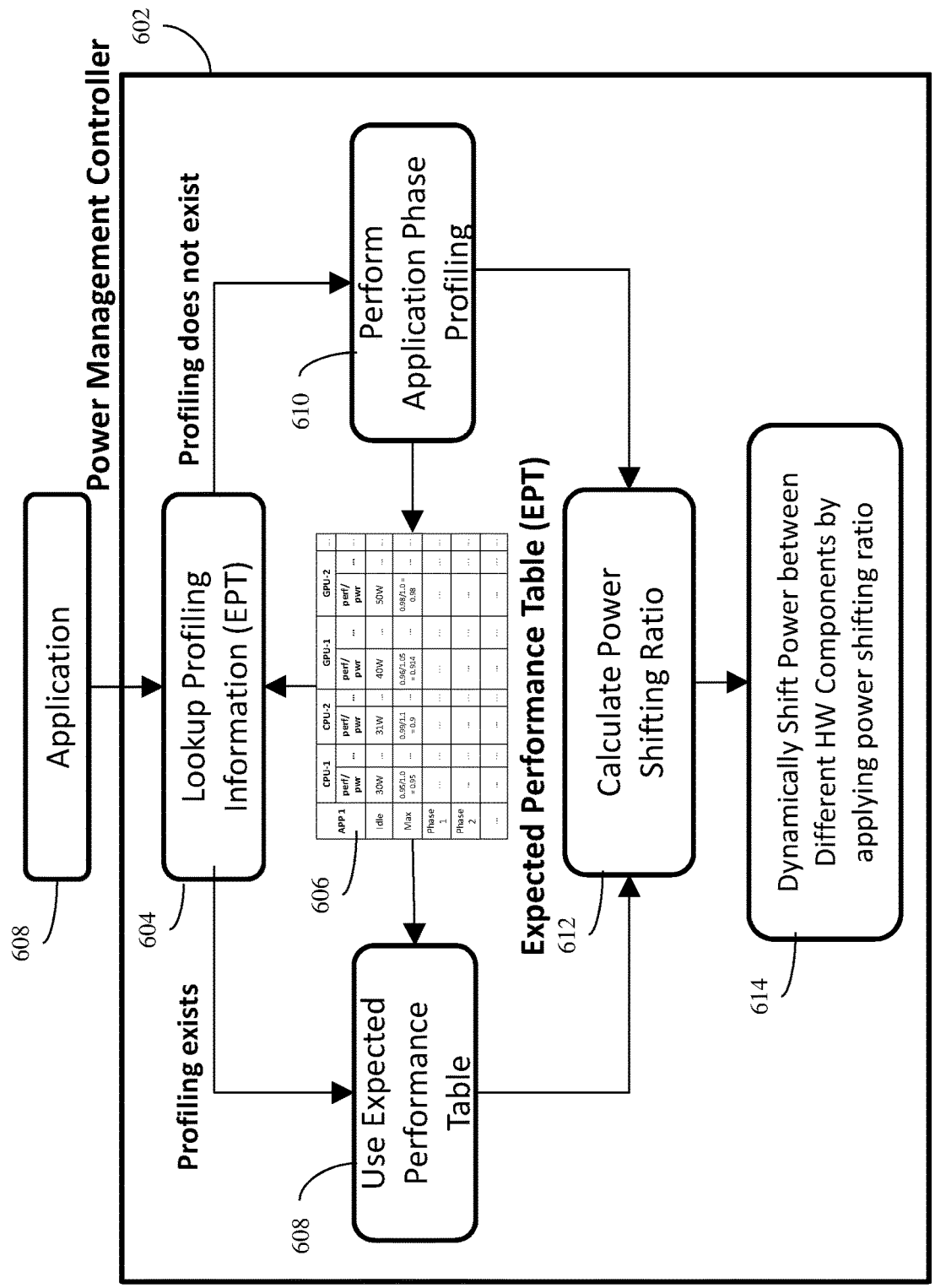
FIG. 6 is a diagram illustrating a flow of a method to shift power between hardware components in one embodiment.

FIG. 6 is a diagram illustrating a flow of a method to shift power between hardware components in one embodiment. A power management controller 602, for instance, coupled with a circuit of a node, in some embodiments, receives an application 604 to run on the node. The node, for instance, as described above, may include a plurality of hardware components, which may include one or more combinations of hardware devices such as a CPU, GPU, FGPA, memory, network interface card, and/or others. At 604, the power management controller 602 may lookup profiling information associated with the application 602 in the EPT 606. Responsive to finding the profiling information in the EPT 606, the power management controller 602 may at 608 use the profiling information, and at 612 based on the profiling information, compute a power shifting ratio.

At 610, responsive to not finding profiling information associated with the application 604 in the EPT 606, the power management controller 602 may perform application phase profiling 610, for example, dynamically. For instance, the application is run, and an annotation technique can mark and separate different application phases for profiling. Profiling tools such as "perf" can be executed to measure performance by reading hardware counters, which record hardware component usage, e.g., CPU usage, memory usage, and/or others. Application phase profiling 610 may be performed as described above with reference to FIGS. 3, 4 and 5, in one embodiment. At 612, based on the profiled information, power management controller 602 computes power shifting ratio.

At 614, the power management controller 602, in some embodiments, shifts power between different hardware components by applying the power shifting ratio. Power shifting may include frequency scaling (e.g., CPU or processor throttling) and/or voltage scaling. For instance, the power management controller 602 may control the amount of current (such as direct current (DC)) supplied to various electrical components of the node based on the power shifting ratio.

Figure 7:
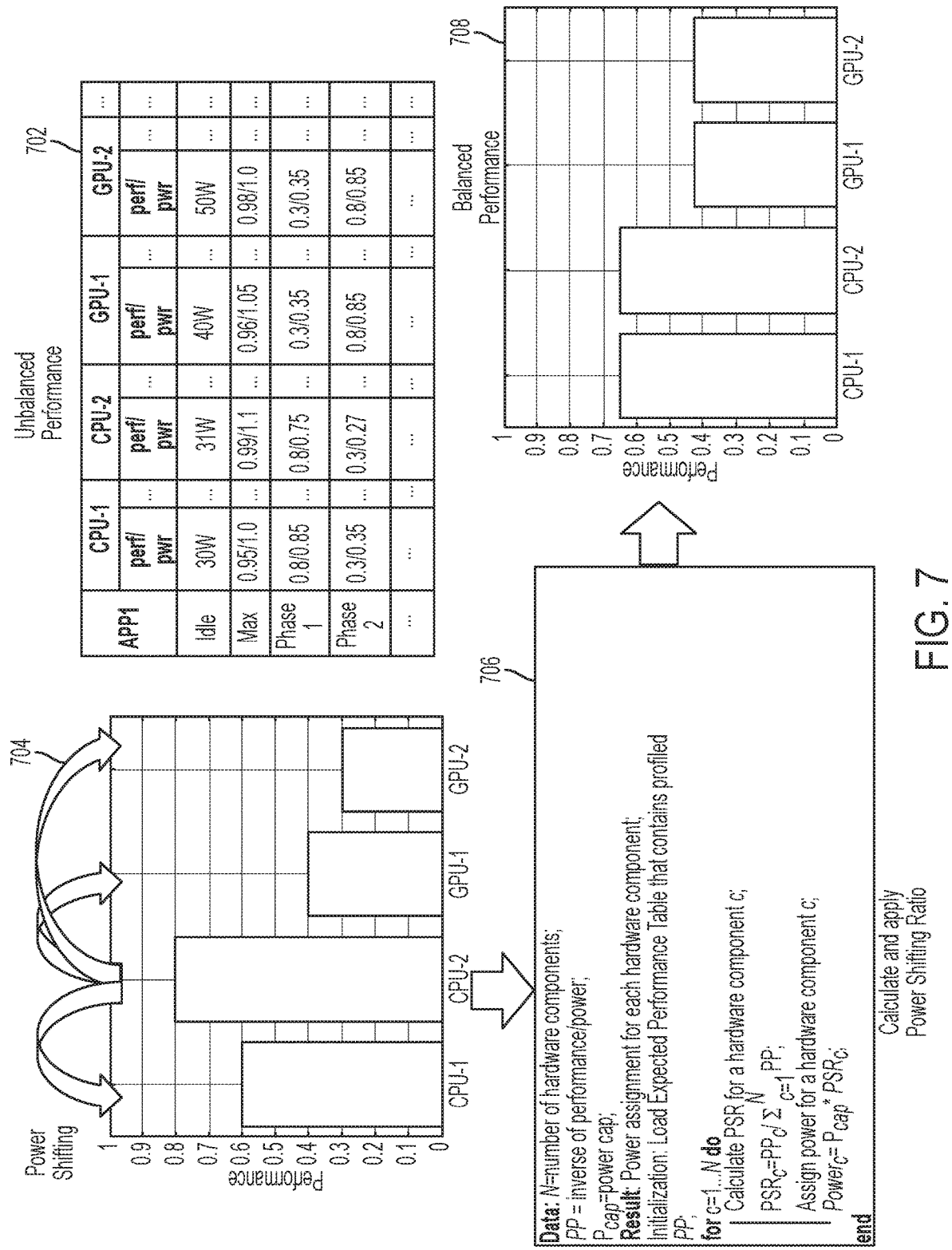
FIG. 7 is a diagram illustrating power shifting among a plurality of hardware components in one embodiment.

FIG. 7 is a diagram illustrating power shifting among a plurality of hardware components in one embodiment. According to the EPT 702, inefficient, efficient, underutilized and highly utilized hardware components are identified. In this example, CPU-2 is identified as efficient and CPU-1, GPU-1 and GPU-2 are identified as inefficient. Accordingly, power is shifted from CPU-2 to CPU-1, GPU-1 and GPU-2 as shown at 704. An embodiment of an algorithm, which computes and applies power shifting ratio is shown at 706. The performance of hardware components after having applied the power sifting ratio is shown at 708.

An example algorithm at 706 which computes and applies power shifting ratio (PSR) is shown is Table 1 as follows. The algorithm, in some embodiments, is performed for each phase of the application during the run of the application.

TABLE 1

Data: N = number of hardware components;
PP = inverse of performance/power (i.e., power/performance);
$P_{cap}$ = power cap associated with a node (total power that can be distributed among components on a node);
Result: Power assignment for each hardware component;
Initialization: Load expected performance table (EPT) that contains profiled PP;
for c = 1 ... N do
    Calculate PSR for a hardware component c;
    $PSR_c = PP_c / \Sigma_{c=1}^{N} PP$;
    Assign power for a hardware component c;
    $Power_c = P_{cap} * PSR_c$;
end /* for */

Figure 8:
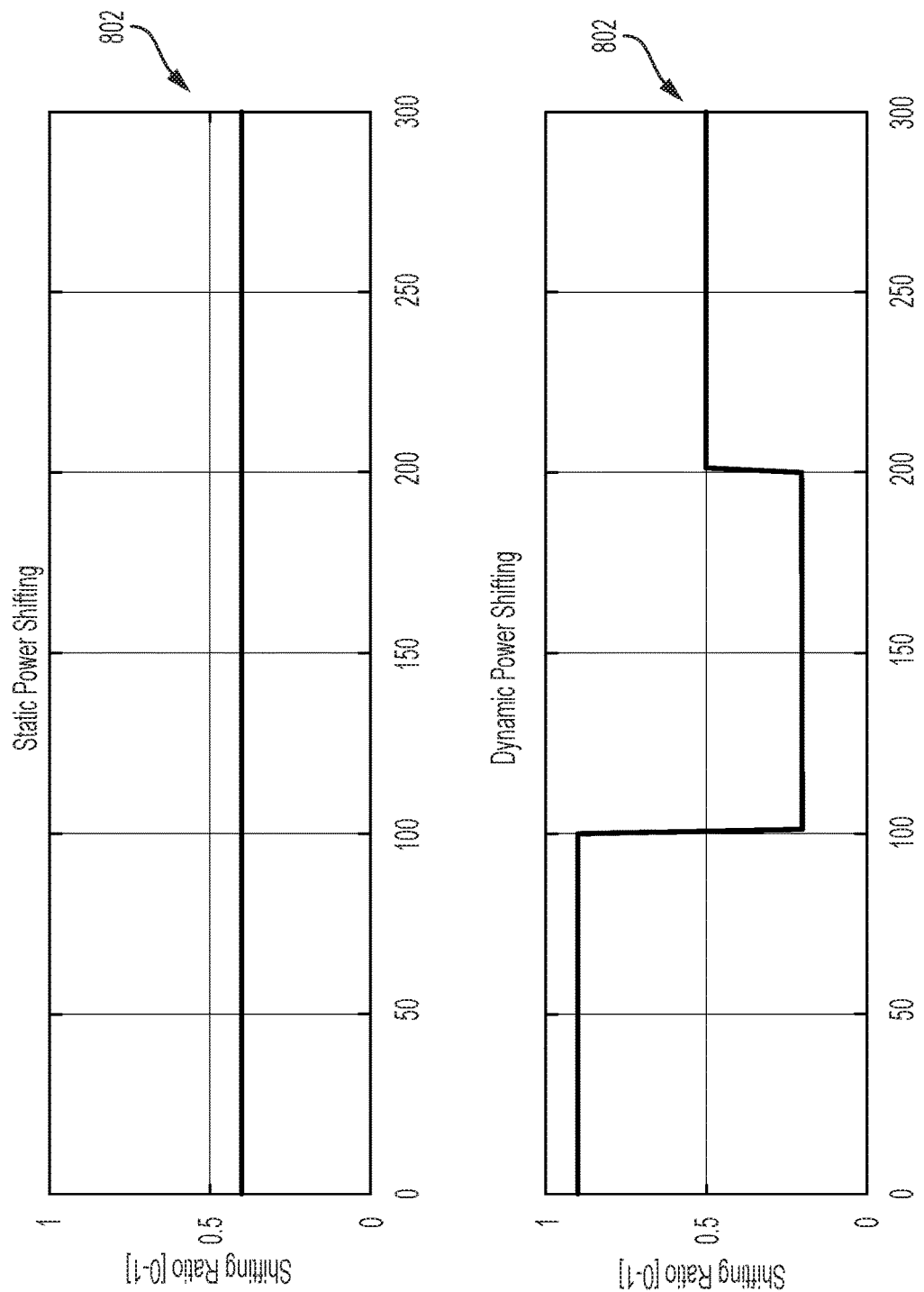
FIG. 8 shows dynamic power shifting according to the present disclosure in one embodiment compared to a static power shifting.

FIG. 8 shows dynamic power shifting according to the present disclosure in one embodiment compared to a static power shifting. Static power shifting ratio (PSR), for example, shown at 802, may be set as follows using as examples mean CPU power of 200 watts (W) and mean GPU power of 300 watts (W):

$$PSR_{static}^{CPU} = Power_{mean}^{CPU}/(Power_{mean}^{CPU} + Power_{mean}^{GPU})$$

Dynamic power shifting ratio determined according to an embodiment in the present disclosure at phase 1 can be set as follows using the profiling information from EPT:

$$PSR_{dynamic}^{CPU} = PP_{Phase1}^{CPU}/(PP_{Phase1}^{CPU} + PP_{Phase1}^{GPU})$$

PP represents inverse of performance/power from EPT, so that less power is assigned to an efficient component. Dynamic power shifting is shown at 804.

Figure 9:
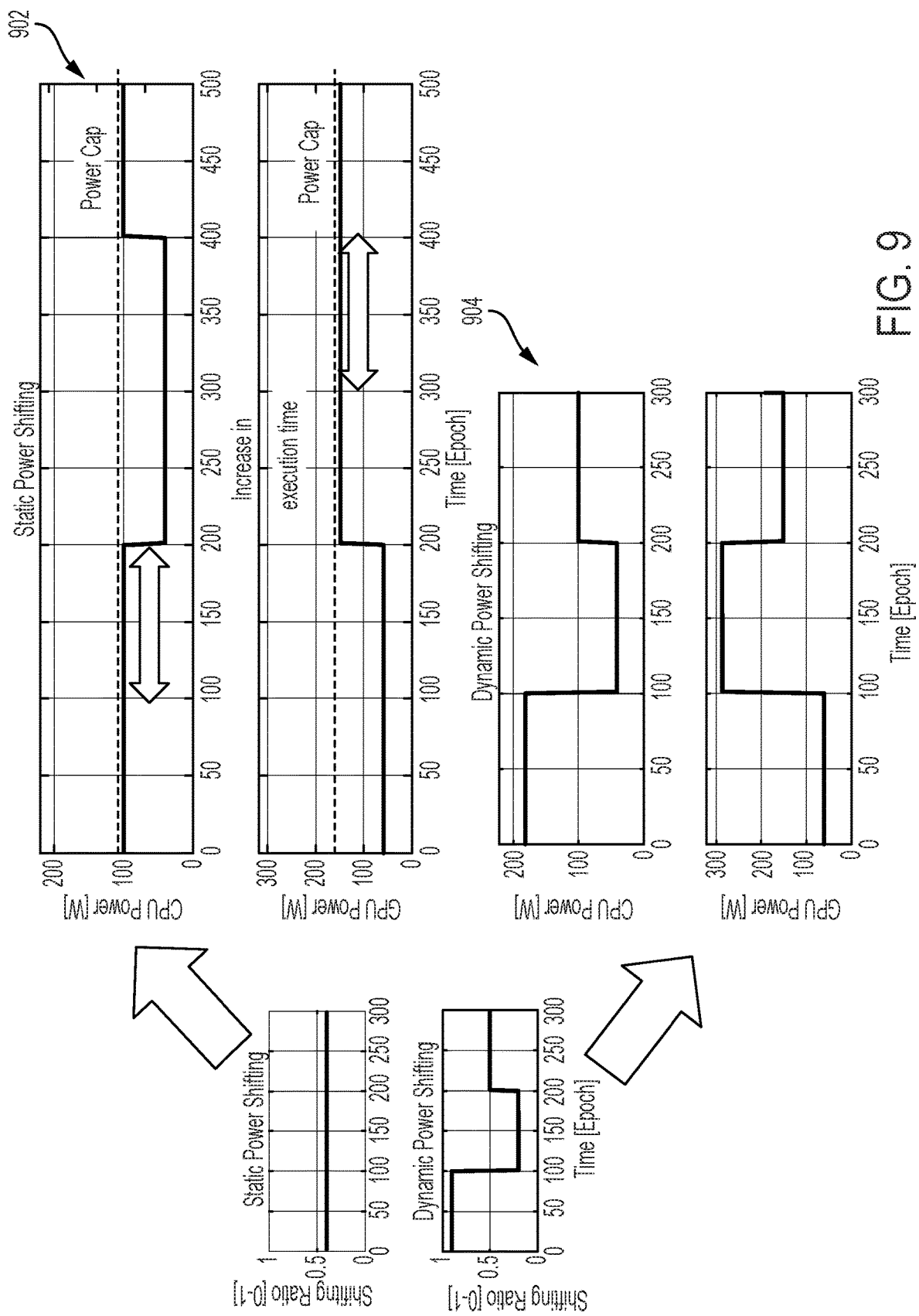
FIG. 9 is a diagram illustrating an example of power shifting in one embodiment, comparing static and dynamic power shifting.

FIG. 9 is a diagram illustrating an example of power shifting in one embodiment, comparing static and dynamic power shifting. As shown at 902, execution time of a node using static power shifting increases because there is not enough power provided to CPU in phase 1 and GPU in phase 2. Referring to 904, the execution time of a node implementing the dynamic power shifting of the present disclosure in one embodiment is not affected substantially, as the PSR changes dynamically and provides power from a slightly-utilized component to the highly-utilized component.

Figure 10:
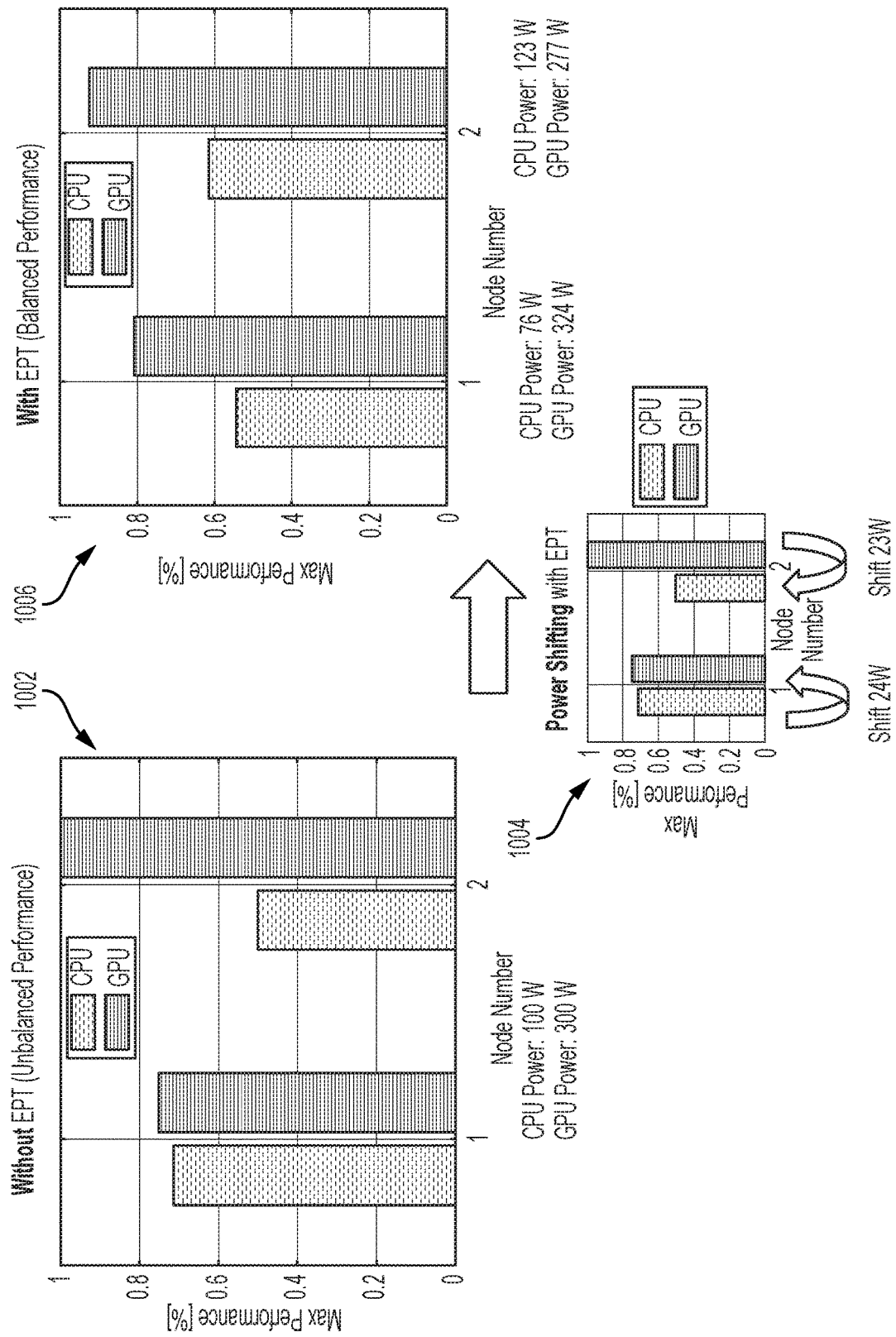
FIG. 10 is a diagram illustrating another example of power shifting in one embodiment, comparing power shifting utilizing an expected performance table (EPT) of the present disclosure in one embodiment and power shifting without utilizing an EPT.

FIG. 10 is a diagram illustrating another example of power shifting in one embodiment, comparing power shifting utilizing an expected performance table (EPT) of the present disclosure in one embodiment and power shifting without utilizing an EPT. FIG. 10 shows hardware components of 2 different nodes, node 1 and node 2. Without an EPT, if a node is assembled with a power-efficient CPU and a power-inefficient GPU, an application using both CPU and GPU may stay inefficient due to the performance imbalance as shown at 1002. With EPT, CPU and GPU performances are in balance with EPT, as EPT automatically captures power variation of components and shifts power from efficient to inefficient components as shown at 1004. For instance, in node 1 power is shifted from CPU to GPU; in node 2, power is shifted from GPU to CPU, based on the EPT's identification of efficient/inefficient and slightly/highly utilized hardware components. Balanced performance is shown at 1006.

Figure 11:
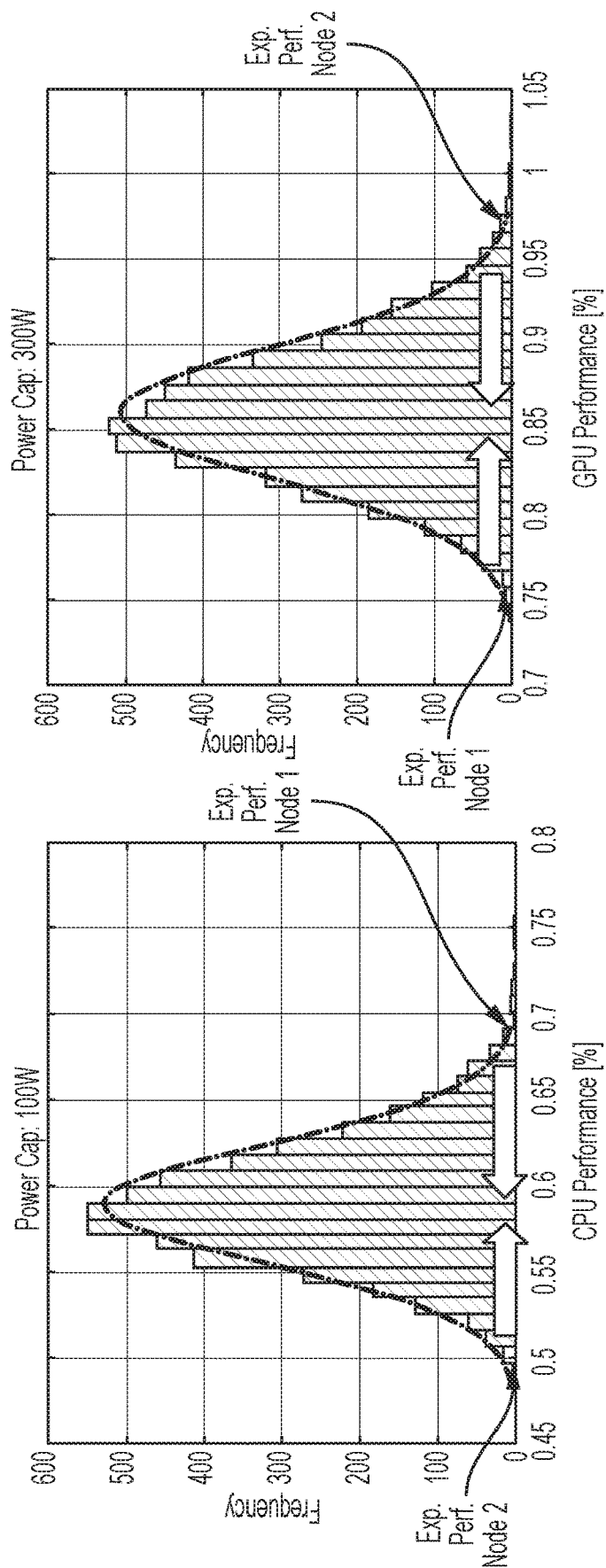
FIG. 11 is a diagram illustrating expected performance of hardware components in a node in one embodiment.

FIG. 11 is a diagram illustrating expected performance of hardware components in a node in one embodiment. In one embodiment, power shifts from efficient to inefficient components. Expected performance is calculated given the power cap. Expected performance moves toward center of the distribution (mean) by shifting power from efficient components to inefficient components. Power shifts proportionally to each component's expected performance.

Figure 12:
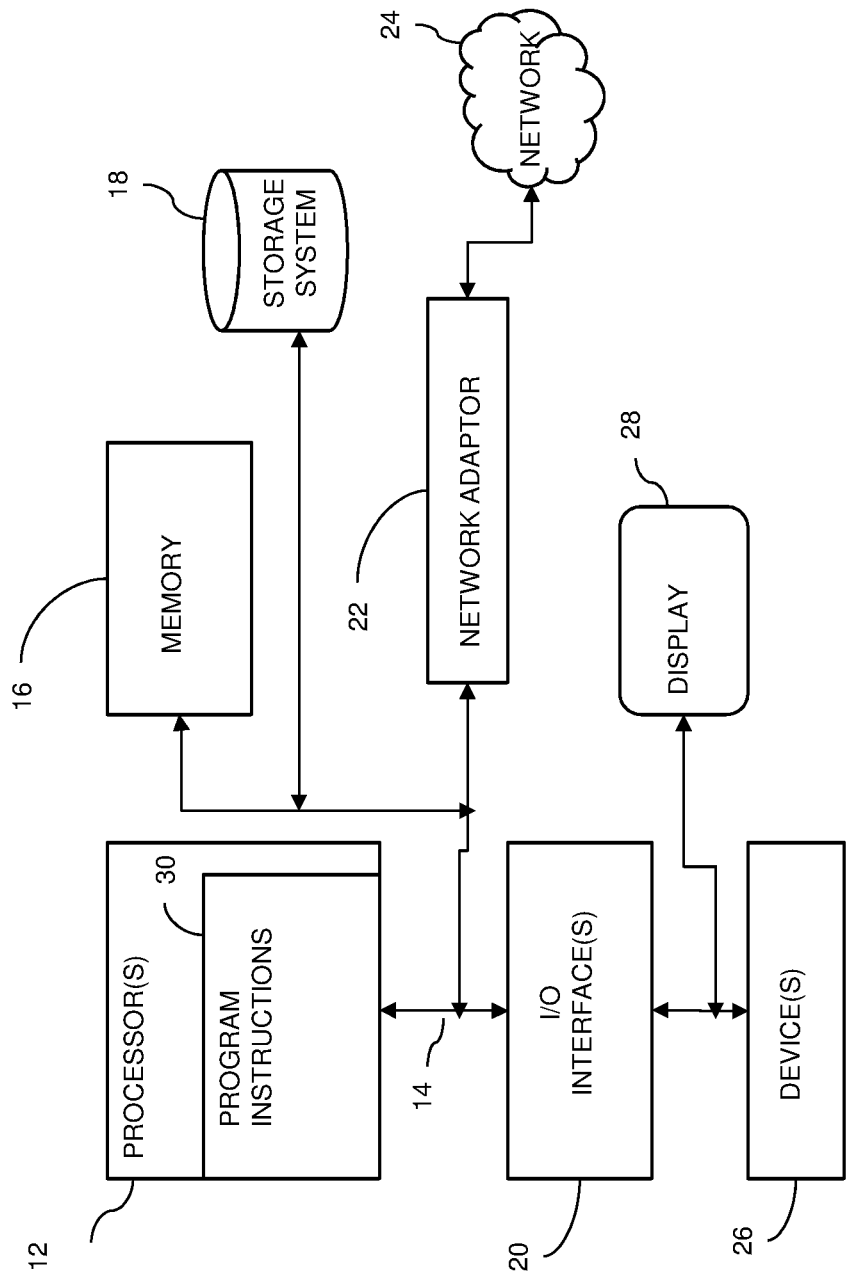
FIG. 12 illustrates a schematic of an example computer or processing system, which may implement some of the functions the system in one embodiment of the present disclosure.

FIG. 12 illustrates a schematic of an example computer or processing system, which may implement some of the functions the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving an application to run on a computer node comprising a plurality of hardware components;
receiving expected performance of the hardware components, the expected performance comprising measured power variation of the hardware components in different phases of the application;
determining a power shifting ratio associated with each of the plurality of hardware components for each of the different phases of the application based on the expected performance; and
dynamically shifting power between the hardware components based on the power shifting ratio at the different phases of the application running on the hardware components.

2. The method of claim of 1, wherein the receiving the expected performance of the hardware components comprises:
searching an expected performance table for the expected performance of the hardware components associated with the application; and
responsive to not finding the expected performance of the hardware components associated with the application, performing application phase profiling of the application.

3. The method of claim 1, wherein the plurality of hardware components comprises one or more combinations of one or more central processing units, one or more graphics processing units, one or more field programmable gate arrays, one or more memory devices, and one or more network interface cards.

4. The method of claim 1, further comprising generating an expected performance table storing the expected performance, the expected performance stored as a normalized measure of performance and power associated with each of the plurality of hardware components per phase of the application.

5. The method of claim 1, where in the power shift ratio associated with a hardware component of the plurality of hardware components is determined as an inverse of performance and power associated with the hardware component divided by a sum of the inverse of performance and power associated with each of the plurality of the hardware components.

6. The method of claim 5, wherein the power shifted to the hardware component is determined as a power cap multiplied by the power shift ratio associated with the hardware component.

7. A computer readable storage medium storing a program of instructions executable by a machine to perform a method comprising:
receiving an application to run on a computer node comprising a plurality of hardware components;
receiving expected performance of the hardware components, the expected performance comprising measured power variation of the hardware components in different phases of the application;
determining a power shifting ratio associated with each of the plurality of hardware components for each of the different phases of the application based on the expected performance; and
dynamically shifting power between the hardware components based on the power shifting ratio at the different phases of the application running on the hardware components.

8. The computer readable storage medium of claim of 7, wherein the receiving the expected performance of the hardware components comprises:
searching an expected performance table for the expected performance of the hardware components associated with the application; and
responsive to not finding the expected performance of the hardware components associated with the application, performing application phase profiling of the application.

9. The computer readable storage medium of claim 7, wherein the plurality of hardware components comprises one or more combinations of one or more central processing units, one or more graphics processing units, one or more field programmable gate arrays, one or more memory devices, and one or more network interface cards.

10. The computer readable storage medium of claim 7, further comprising generating an expected performance table storing the expected performance, the expected performance stored as a normalized measure of performance and power associated with each of the plurality of hardware components per phase of the application.

11. The computer readable storage medium of claim 7, where in the power shift ratio associated with a hardware component of the plurality of hardware components is determined as an inverse of performance and power associated with the hardware component divided by a sum of the inverse of performance and power associated with each of the plurality of the hardware components.

12. The computer readable storage medium of claim 11, wherein the power shifted to the hardware component is determined as a power cap multiplied by the power shift ratio associated with the hardware component.

13. An apparatus, comprising:
a node comprising hardware components;
a power management controller coupled to a circuit of the node; and
a memory storing expected performance table, the power management controller operable to at least:
receive an application to run on a computer node comprising a plurality of hardware components;
receive expected performance of the hardware components, the expected performance comprising measured power variation of the hardware components in different phases of the application;
determine a power shifting ratio associated with each of the plurality of hardware components for each of the different phases of the application based on the expected performance; and
dynamically shift power between the hardware components based on the power shifting ratio at the different phases of the application running on the hardware components.

14. The apparatus of claim of 13, wherein the power management controller receiving the expected performance of the hardware components comprises:
searching an expected performance table for the expected performance of the hardware components associated with the application; and responsive to not finding the expected performance of the hardware components associated with the application, performing application phase profiling of the application.

15. The apparatus of claim of 13, wherein the plurality of hardware components comprises one or more combinations of one or more central processing units, one or more graphics processing units, one or more field programmable gate arrays, one or more memory devices, and one or more network interface cards.

16. The apparatus of claim of 13, wherein the expected performance table stores the expected performance stored as a normalized measure of performance and power associated with each of the plurality of hardware components per phase of the application.

17. The apparatus of claim of 13, where in the power shift ratio associated with a hardware component of the plurality of hardware components is determined as an inverse of performance and power associated with the hardware component divided by a sum of the inverse of performance and power associated with each of the plurality of the hardware components.

18. The apparatus of claim of 17, wherein the power shifted to the hardware component is determined as a power cap multiplied by the power shift ratio associated with the hardware component.

19. The apparatus of claim 13, wherein the power management controller further measures the performance and power associated with each of the plurality of hardware components per phase of the application to update the expected performance table.

20. The apparatus of claim 13, wherein the power management controller further measures power variation of the hardware components and stores the power variation in the expected performance table.

* * * * *